United States Patent [19]

Warnsholz et al.

[11] Patent Number: 4,896,491
[45] Date of Patent: Jan. 30, 1990

[54] HYDRAULIC ROW UNIT DRIVE FOR A COTTON HARVESTER

[75] Inventors: Gary L. Warnsholz, Des Moines; Wendell D. Reece, Ankeny, both of Iowa; Kevin D. McKee, Lexington, Ky.

[73] Assignee: Deere & Company, Moline, Ill.

[21] Appl. No.: 305,572

[22] Filed: Feb. 3, 1989

[51] Int. Cl.$^4$ ............................................. A01D 46/10
[52] U.S. Cl. .......................................... 56/28; 56/10.2
[58] Field of Search ............... 56/10.2, 10.6, 10.8, 56/10.9, 11.1, 11.9, DIG. 15, 28, 30

[56] References Cited

U.S. PATENT DOCUMENTS

| | | | |
|---|---|---|---|
| 2,800,028 | 7/1957 | Fergason | 74/15.4 |
| 3,589,109 | 6/1971 | Payne | 56/10.2 |
| 3,999,359 | 12/1976 | Jordan et al. | 56/10.2 X |
| 4,188,772 | 2/1980 | Jordan et al. | 56/10.2 |
| 4,249,365 | 2/1981 | Hubbard et al. | 56/28 X |
| 4,335,561 | 6/1982 | Swanson et al. | 56/11.9 X |
| 4,821,497 | 4/1989 | Deutsch et al. | 56/30 X |

Primary Examiner—Thuy M. Bui

[57] ABSTRACT

Picking unit drive structure for transversely adjustable row units of a cotton harvester. A hydraulic drive system with an engine driven pump supplies fluid under pressure through flexible conduits to individual hydraulic motors located on the row units and drivingly connected to the unit harvesting structures. Flow to the motor is regulated by a flow-control valve and an electronic valve controller to synchronize picker drum speed with harvester ground speed. The hydraulic drive eliminates external drive shafts and significantly enhances transverse adjustment of the row units.

15 Claims, 2 Drawing Sheets

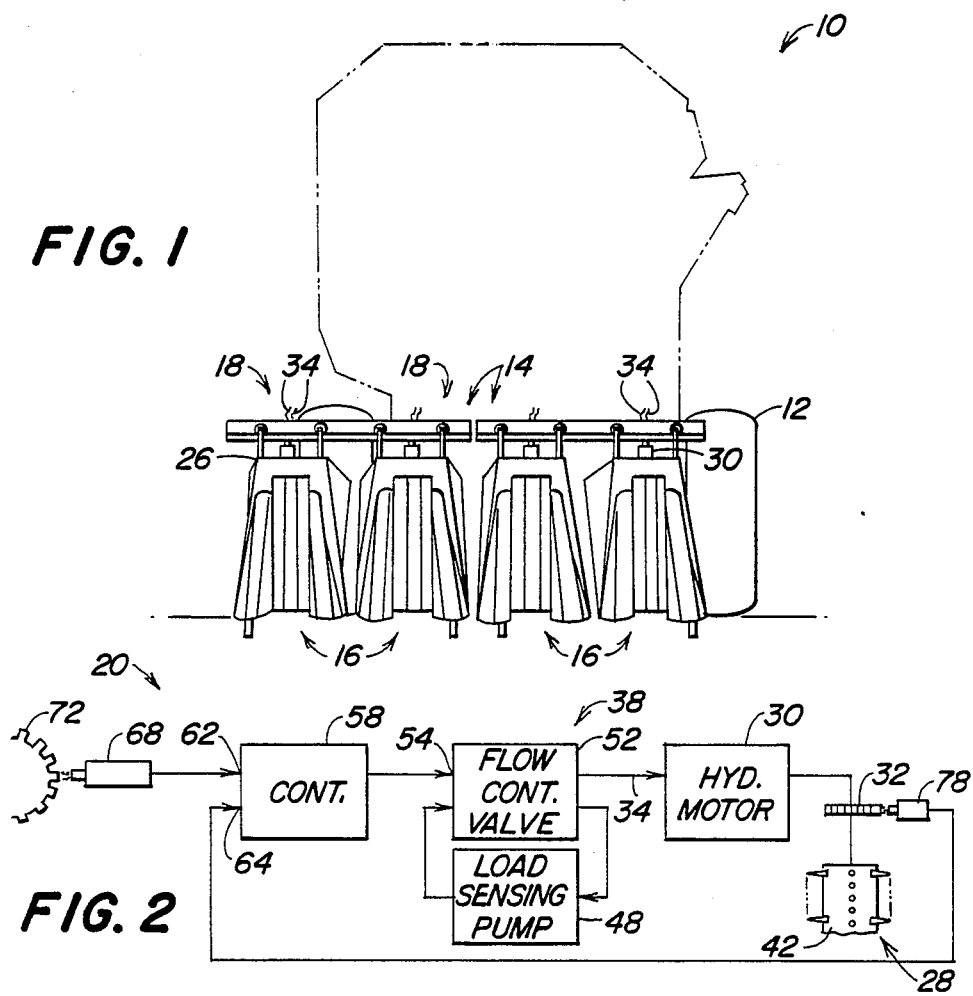
FIG. 1
FIG. 2
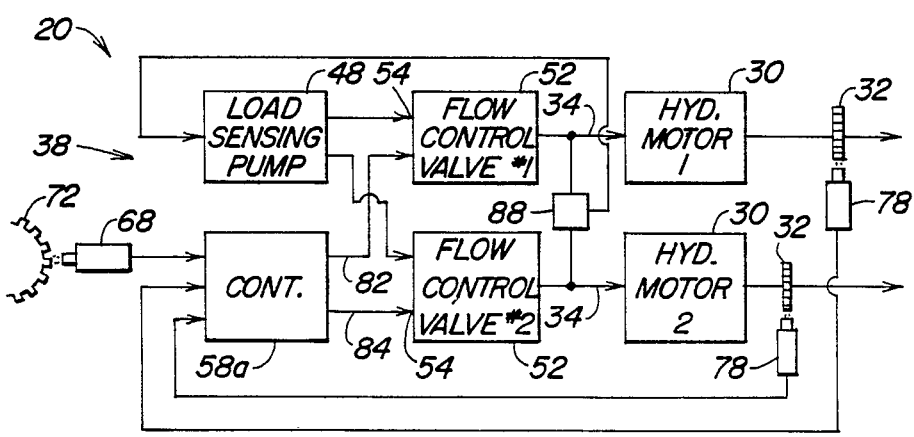
FIG. 3

HYDRAULIC ROW UNIT DRIVE FOR A COTTON HARVESTER

BACKGROUND OF THE INVENTION

The present invention relates generally to cotton harvesters and, more specifically, to an improved row unit drive arrangement for a cotton harvester with transversely adjustable row units.

A typical cotton harvester includes a plurality of transversely spaced row units mounted at the forward end of the harvester frame and including harvesting structure connected to gearboxes mounted on the row unit and connected to a drive train arrangement which is driven from the engine by a fore-and-aft extending drive shaft. The gearboxes on the individual units are normally connected by transverse drive shafts. Drive is provided through the harvester transmission so that harvesting structure speed is synchronized with the forward speed of the harvester to assure that the spindle drums rotate rearwardly at the harvester ground speed to achieve a zero relative velocity between the picking spindles and the cotton plants. The various drive shafts in the conventional arrangement require a considerable amount of space, and clearance must be provided for the fore-and-aft extending drive shafts to permit the row units to move vertically and to facilitate some transverse adjustment of the row units connected to the drive shafts. In addition, the shafts extending transversely between the row units must be disconnected or must utilize a telescoping arrangement to permit transverse movement of the row units relative to each other for maintenance or for changing row spacings. Therefore, the drive system can be relatively complex and inflexible, and can limit the patterns of row units available for the harvest.

BRIEF SUMMARY OF THE INVENTION

It is therefore an object of the present invention to provide an improved row unit drive arrangement for a cotton harvester. It is a further object to provide such an arrangement which overcomes the above-mentioned problems.

It is yet another object of the present invention to provide an improved row unit drive arrangement for a cotton harvester which facilitates more mounting configurations and row spacing variations than with previously available drive arrangements. It is still another object to provide such an arrangement which simplifies the transmission of power from the engine to the row units.

It is a further object of the present invention to provide an improved drive arrangement for the row units of a cotton harvester which eliminates the need for drive shafts extending transversely between the row units. It is still another object of the invention to provide such an arrangement which also eliminates fore-and-aft extending drive shafts and yet which synchronizes the harvesting structure speed with the harvester ground speed.

In accordance with the above objects, a row unit drive arrangement for transversely adjustable row units on a cotton harvester includes an engine driven pump connected by flexible hoses through control valves to hydraulic motors on the individual row units. An electronic controller is connected to the hydraulic control valves and senses the transmission output speed and the row unit output speeds to synchronize the harvesting structure speed with the harvester ground speed. The arrangement eliminates many rigid mechanical components that would otherwise limit the options of unit placement and row spacing arrangements on the harvester. More unit mounting configurations and row spacing variations are possible with the flexible hydraulic drive. The row units may be moved transversely to open up areas for servicing and inspection without having to disconnect the drive. External rotating shafts are substantially eliminated.

These and other objects, features and advantages of the present invention will become apparent to those skilled in the art from the description which follows and from the drawings.

Brief Description of the Drawings

FIG. 1 is a front view of a cotton harvester with transversely adjustable row units including the drive arrangement of the present invention.

FIG. 2 is a schematic representation of the drive utilized in the cotton harvester of FIG. 1.

FIG. 3 is a schematic diagram similar to that of FIG. 2 but showing the drive for two row units.

Description of the Preferred Embodiment

Figure 4:
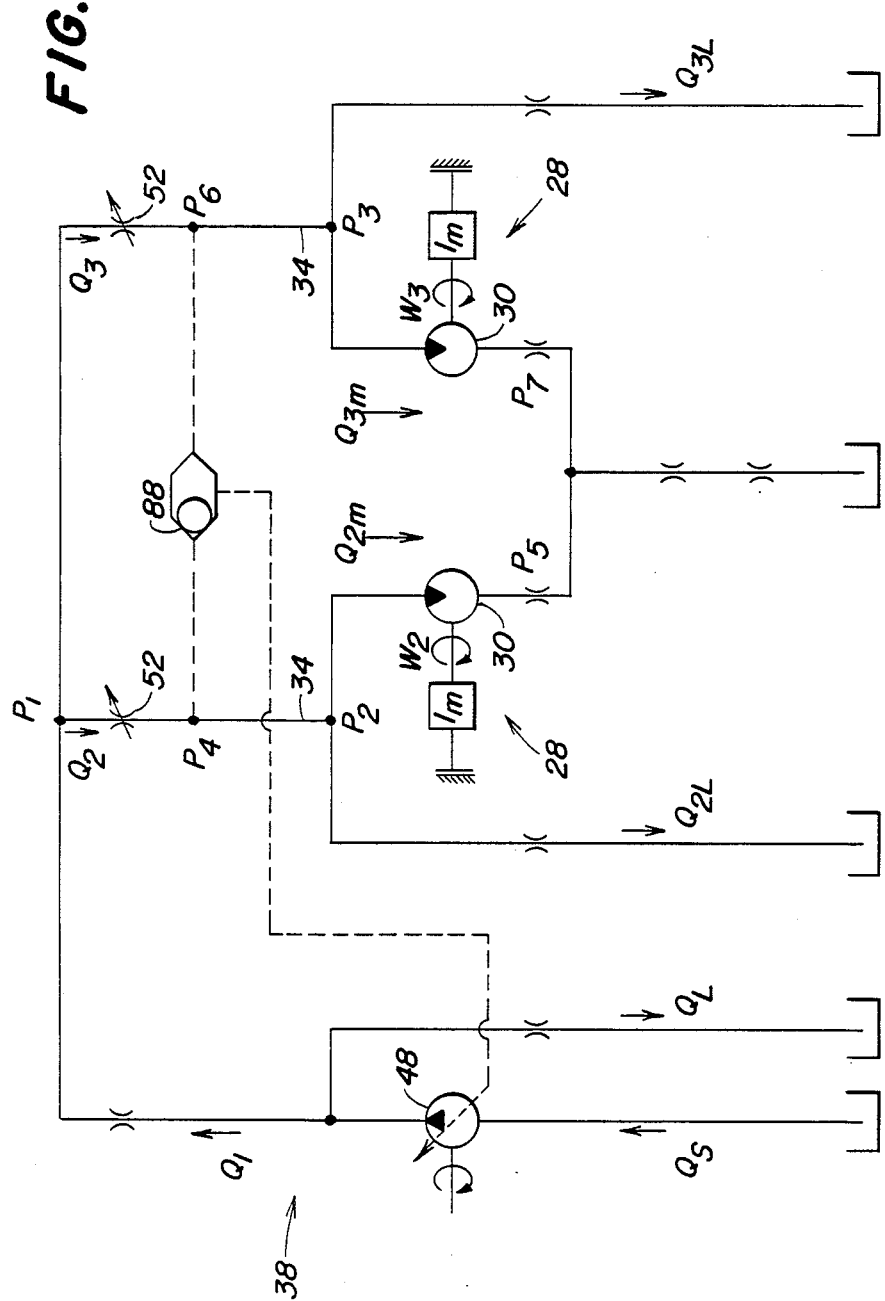
FIG. 4 is a schematic representation of the hydromechanical arrangement for a two row unit system.

Referring to FIG. 1, there is shown a cotton harvester 10 supported by wheels 12 for forward movement over the ground. A transversely extending row unit lift frame 14 is connected to the forward end of the harvester, and a plurality of individual row units 16 are transversely spaced along the lift frame 14. As shown in FIG. 1, the row units 16 are supported by roller assemblies 18, of the type shown and described in co-pending and commonly assigned application Ser. No. 087,073 filed 19 Aug. 1987, now U.S. Pat. No. 4,803,830, so that they may be moved easily to accommodate different row spacings or to open up spaces between the row units for servicing and maintenance. The row units may be of the type shown and described in co-pending and commonly assigned application Ser. No. 233,880 filed 11 Aug. 1988 now U.S. Pat. No. 4,821,497. However, an improved row unit drive arrangement, indicated generally at 20, is provided for operating the individual row units and permitting transverse adjustments of the row units without disconnecting the drive.

Each row unit 16 includes a housing 26 supporting harvesting structure 28. A hydraulic motor 30 is supported on the row unit 16 and is drivingly connected to the harvesting structure 28 through a transmission including a gear 32. Each hydraulic motor 30 is connected by flexible hydraulic fluid lines 34 to a source of controlled fluid, indicated generally at 38 in FIGS. 2 and 3, located on the harvester 10. Hydraulic fluid from the controlled source 38 is provided through the flexible lines 34 to the hydraulic motors 30 on the individual row units 16. Flow through each line 34 is controlled so that the hydraulic motor 30 rotates the picker spindle drums, indicated generally at 42 in FIG. 2, at a speed synchronized with the forward speed of the harvester 10. The flexible lines 34 permit the row units 16 to be moved transversely on the lift frame 14 for maintenance and servicing or to accommodate numerous combinations of row unit spacings. By eliminating rigid components of the mechanical drive system, space savings and unit placement capabilities are significantly enhanced.

The controlled source of fluid 38 includes a load sensing hydraulic pump 48 driven by the engine on the harvester 10. The output of the load sensing pump 48 is connected to the input of a flow control valve 52. The output of the flow control valve 52 is connected through the hydraulic fluid line 34 to the corresponding hydraulic motor 30 on the row unit 16. Preferably the flow control valve 52 is an electro-hydraulic valve of the type exemplified by the Pulsar TM valve commerically available from Enerpac Group, a division of Applied Power, Inc. of Butler, Wis. The valve has a valve orifice determined by a variable duty cycle control signal applied to a control input indicated generally at 54. The input 54 is connected to an electronic controller 58 having a first input 62 for receiving a signal dependent on the forward ground speed of the cotton harvester 10. The controller 58 includes a second input 64 for receiving a second signal dependent upon the speed of the hydraulic motor 30. As shown in FIG. 2, the first input 62 is connected to a magnetic pickup 68 located adjacent a transmission output gear 72 which drives the ground wheels 12 on the harvester. As the gear teeth pass the pickup 68, a signal is provided to the input 62, the frequency of which is dependent upon the speed of rotation of the gear 72. The speed of the hydraulic motor 30 is measured by a magnetic pickup 78 located adjacent the gear 32 on the output of the hydraulic motor 30. As the hydraulic motor 30 rotates the gear 32 and thus drives the harvesting structure 28, a signal is provided at the input 64, the frequency of which is dependent upon the speed of rotation of the gears 32. The controller 58 compares the input signals at 62 and 64 and provides a variable signal to the flow control valve input 54 having a duty cycle dependent upon the comparison. If the frequency at the input 64 drops below the desired frequency as compared to the input at 62, indicating that the drive speed of the harvesting structure of 28 is below the desired speed for the forward ground speed of the harvester 10, the controller 58 increases the duty cycle of signal to the input 54 to increase the size of the control valve opening to increase hydraulic flow to the hydraulic motor 30 and increase the speed of the harvesting structure 28 until it is synchronized with the forward speed of the cotton harvester 10. If the forward speed of the cotton harvester 10 as indicated by the signal at 62 drops below the speed of the harvesting structure 28, the controller decreases the duty cycle of the signal to the input 54 to decrease the orifice on the flow control valve 52 and decrease hydraulic flow to the motor 30 to slow the harvesting structure 28 until it is synchronized with the forward speed of the cotton harvester 10. The load sensing pump 48 controls pump outlet pressure as a function of the load pressure at the valve output 52. As the demand on the hydraulic motor 30 increases from loading on the harvesting structure 28, the output of the pump 48 will increase in pressure accordingly.

In a system where two row units 16 are driven from a single pump (FIG. 3), two flow control valves 52 are connected to corresponding hydraulic motors 30 on the individual row units 16. The valves 52 are driven by a single controller 58a which operates similarly to the controller 58 but which has two independent valve command outputs 82 and 84 connected to the flow control valves 52. Output load for the load-sensing pump 48 is provided through a shuttle valve 88 which communicates the highest of the pressures appearing at the outputs of the flow control valves 52 to the input of the load-sensing pump 48. The output pressure of the pump 48 will increase in pressure as necessary to meet the demands of the most heavily loaded row unit.

The basic connection of the hydromechanical components utilized with the two-unit hydraulic circuitry of FIG. 3 is shown schematically in FIG. 4. The following symbols are used in FIG. 4:

Im—picker unit inertia
P1—control valve inlet pressure
P2—hydraulic motor inlet pressure for unit 1
P3—hydraulic motor inlet pressure for unit 2
P4—control valve outlet pressure for unit 1
P5—hydraulic motor outlet pressure for unit 1
P6—control valve outlet pressure for unit 2
P7—hydraulic motor outlet pressure for unit 2
Q1—hydraulic pump outlet flow
Q2—flow into unit 1 control valve
Q2l—hydraulic motor leakage for unit 1
Q2m—hydraulic motor flow for unit 1
Q3—flow into unit 2 control valve
Q3l—hydraulic motor leakage for unit 2
Q3m—hydraulic motor flow for unit 2
Qs—ideal hydraulic pump flow
Ql—hydraulic pump leakage Having described the preferred embodiment, it will be apparent that modifications can be made without departing from the scope of the invention as defined in the accompanying claims.

We claim:

1. A row unit drive assembly for a cotton harvester having a frame supported for forward movement over the ground at varying ground speeds, the frame supporting a plurality of transversely adjustable row units each having drivable cotton harvesting structure, the row unit drive structure assembly comprising:

a source of hydraulic fluid located on the harvester;
each row unit including a hydraulic motor drivingly connected to the corresponding cotton harvesting structure;
flexible conduit means connected to each hydraulic motor for supplying fluid from the source to the motor to drive the harvesting structure and facilitating transverse adjustment of the row units without disassembly of the drive structure assembly;
a sensor for providing a signal dependent on the ground speed of the harvester; and
flow-control means located between the source and the hydraulic motor and responsive to the ground speed signal for causing the motor to drive the harvesting structure at a speed dependent on the ground speed of the harvester.

2. The invention as set forth in claim 1 wherein the flow-control means comprises a flow-control valve, and a valve controller connected to the flow-control valve and responsive to the drive speed of the motor and the ground speed signal.

3. A row unit drive assembly for a cotton harvester having a frame supported for forward movement over the ground at varying ground speeds, the frame supporting at least two transversely adjustable row units each having drivable cotton harvesting structure including a spindle drum rotatable about an upright axis, the row unit drive structure assembly comprising:

a controllable source of hydraulic fluid located on the harvester;
a hydraulic motor supported from each row unit and means drivingly connecting the motor to the corresponding cotton harvesting structure;

flexible conduit means connected to each hydraulic motor for supplying fluid from the source to the motor to drive the harvesting structure and rotate the spindle drum about the upright axis, said conduit facilitating transverse adjustment of the row units without disassembly of the drive structure assembly; and means controlling the source of hydraulic fluid for rotating the spindle drums at a speed synchronized with the forward speed of the harvester.

4. The invention as set forth in claim 1 wherein the means controlling the source includes means for producing a ground speed signal, means for producing a drum speed signal, and means responsive to the ground speed and drum speed signals for varying fluid flow through the conduits.

5. The invention as set forth in claim 4 wherein the source includes a load responsive pump connected to the hydraulic motors.

6. The invention as set forth in claim 5 wherein the load responsive pump is connected to at least two hydraulic motors.

7. The invention as set forth in claim 6 including a flow-control valve connected between the load responsive pump and each of said at least two hydraulic motors.

8. The invention as set forth in claim 7 including shuttle valve means connected to the flow control valve outputs for providing a load pressure feedback signal to the pump.

9. A row unit drive assembly for a cotton harvester having a frame supported for forward movement over the ground at varying ground speeds, the frame supporting a plurality of transversely adjustable row units each having drivable cotton harvesting structure, the row unit drive structure assembly comprising:

a source of hydraulic fluid located on the harvester;
each row unit including a hydraulic motor drivingly connected to the corresponding cotton harvesting structure;
flexible conduit means connected to each hydraulic motor for supplying fluid from the source to the motor to drive the harvesting structure and facilitating transverse adjustment of the row units without disassembly of the drive structure assembly;
wherein the source includes a load responsive pump connected to at least two hydraulic motors;
a flow control valve connected between the load responsive pump and each of said at least two hydraulic motors; and
speed control means connected to the flow control valves and responsive to the ground speed of the harvester for controlling the valves to operate the motors at speeds dependent on the ground speed.

10. In a cotton harvester having a main frame supported for forward movement over the ground at varying speeds, the frame supporting at least first and second transversely adjustable row units having first and second drivable cotton harvesting structures, respectively, each including rotatable upright drum structure, drive structure comprising:

a first hydraulic motor connected to the first row unit and movable transversely therewith, said first motor drivingly connected to the first cotton harvesting structure for rotating the corresponding upright drum structure;
a second hydraulic motor connected to the second row unit, said second motor drivingly connected to the second cotton harvesting structure for rotating the corresponding upright drum structure;
a hydraulic pump having an input connected to a source of hydraulic fluid on the harvester and an output;
conduit means connecting the pump output with the hydraulic motors including a flexible conduit connected between the output and the first hydraulic motor for driving the first motor from the pump and facilitating transverse adjustment of the first row unit; and
means controlling the first and second motors for driving the drum structures at a speed dependent on the forward speed of the harvester.

11. The invention as set forth in claim 10 wherein the conduit means further includes a second flexible conduit connected between the pump output and the second hydraulic motor for driving the second motor from the pump and facilitating transverse adjustment of the second row unit.

12. The invention as set forth in claim 10 wherein the means controlling the first and second motors includes flow control means for changing the flow of hydraulic fluid from the pump to the first and second motors in response to changes in the ground speed of the harvester.

13. The invention as set forth in claim 12 wherein the flow control means includes a flow-control valve connected between the pump output and the motors.

14. In a cotton harvester having a main frame supported for forward movement over the ground at varying speeds, the frame supporting at least first and second transversely adjustable row units having first and second drivable cotton harvesting structures, respectively, drive structure comprising:

a first hydraulic motor connected to the first row unit and movable transversely therewith, said first motor drivingly connected to the first cotton harvesting structure;
a second hydraulic motor connected to the second row unit, said second motor drivingly connected to the second cotton harvesting structure;
a hydraulic pump having an input connected to a source of hydraulic fluid on the harvester and an output; and
conduit means connecting the pump output with the hydraulic motors including a flexible conduit connected between the output and the first hydraulic motor for driving the first motor from the pump and facilitating transverse adjustment of the first row unit;
means controlling the flow of hydraulic fluid from the pump to the first and second motors for driving the harvesting structures at a speed dependent on the ground speed of the harvester; and
wherein the means controlling flow includes means for producing a ground speed signal, means for producing a motor speed signal, and valve means responsive to the ground and motor speed signals.

15. The invention as set forth in claim 14 wherein the pump is a load responsive pump and includes a control input connected to the valve means.

* * * * *